(12) United States Patent
Niakan et al.

(10) Patent No.: US 7,556,009 B2
(45) Date of Patent: Jul. 7, 2009

(54) AIR INTAKE MANIFOLD FOR COUPLING THE OUTPUT OF A COMPRESSOR TO THE AIR INTAKE OF AN INTERNAL COMBUSTION ENGINE

(75) Inventors: Shahriar Nick Niakan, Anaheim Hills, CA (US); Stuart T. Miyagishima, Upland, CA (US); Jack T. Nguyen, San Clemente, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 91 days.

(21) Appl. No.: 11/899,861

(22) Filed: Sep. 7, 2007

(65) Prior Publication Data

US 2009/0064959 A1    Mar. 12, 2009

(51) Int. Cl.
*F02M 35/10* (2006.01)
(52) U.S. Cl. .................. 123/184.21; 285/179; 285/405
(58) Field of Classification Search ............ 123/184.21; 285/179, 405
See application file for complete search history.

(56) References Cited

U.S. PATENT DOCUMENTS 6,755,169 B2 * 6/2004 Storz ..................... 123/184.21

OTHER PUBLICATIONS

IDS Item 1—digital photograph of 2003-2007 Dodge Ram intake manifold for diesel engine.
IDS Item 2—digital photograph of an ATS aftermarket intake manifold.
IDS Item 3—digital photograph of a Banks aftermarket intake manifold (including the stock manifold).
IDS Item 4—digital photograph of a cut away CFM+ and Banks intake manifold.
IDS Item 5—digital photograph of a CFM+ aftermarket manifold as installed in the engine compartment.
IDS Item 6—digital photograph of a commercial aftermarket intake manifold in accordance with the invention as..installed in the engine compartment.
Arthur F. Frass, Heat Exchanger Design, pp. 158-161 2nd Edition 1989.

* cited by examiner

*Primary Examiner*—Noah Kamen
(74) *Attorney, Agent, or Firm*—Paul J. Backofen, Esq.; Crockett & Crockett (57) ABSTRACT

An elongated air intake manifold, for coupling a compressor outlet to the air intake of an internal combustion engine, includes bottom, top and side walls progressing from a circular upstream end through a sweeping curved central section to a 90° bend section terminating in a peripheral rim surrounding an air outlet port. The peripheral rim has opposed proximal and distal sides and a lower surface facing the engine air intake opening. A pair of proximal and distal mounting screw receptacles are formed integrally with and located on the interior and exterior of the manifold, respectively, for receiving mounting screws to secure the manifold to the engine. Preferably, the proximal mounting screw receptacles are arranged so that the heads of the mounting screws extend a minimum distance into the manifold interior. Optionally, one or more turning vanes may be positioned in the bend section interior of the manifold.

20 Claims, 8 Drawing Sheets

AIR INTAKE MANIFOLD FOR COUPLING THE OUTPUT OF A COMPRESSOR TO THE AIR INTAKE OF AN INTERNAL COMBUSTION ENGINE

FIELD OF THE INVENTION

The present invention relates to intake manifolds and more particularly to an aftermarket air intake manifold for connecting the output of a compressor, such as a turbocharger, to the air intake of an internal combustion engine.

BACKGROUND OF THE INVENTION

Original equipment manufactured ("OEM") manifolds for channeling air flow between a compressor, such as a turbocharger outlet and the air intake of an internal combustion engine frequently provide less then optimum fluid flow characteristics thereby preventing the engine from achieving optimum performance.

An example of such sub-optimal performance is the OEM or stock intake manifold for the 2003-2007 Dodge Ram Commonrail® engine trucks utilizing tubrocharged Cummins® 5.9L diesel engines. The engine's air intake or opening port (positioned below the manifold) is connected to the outlet of the turbocharger's intercooler via a bellows type hose and hose clamp identified in the photo. The manifold's outlet is secured over the engine's air intake opening via bolts or screws as shown.

The stock manifold was (and still is) deficient in several aspects, e.g., in providing a limited cross-sectional area for air flow and in its mounting arrangement for securing the outlet end to the engine air intake plate. The latter deficiency results from the pinched-in-sides of the manifold adjacent the outlet end which accommodate the two manifold/engine air intake mounting screws closest to the turbocharger ("proximal mounting screws").

One setting out to replace a stock component such as the above intake manifold faces certain constraints. In addition to cost and head room, i.e., distance to the hood, the position (and orientation) of the turbocharger's outlet and the engine's air intake port come into play. In this example, the air intake port (rectangular in shape) is formed in a horizontal section of a plate bracketed by two proximal threaded blind bores (nearest the turbocharger) and two opposed distal threaded bores (remote from the turbocharger). The threaded bores are arranged to receive mounting screws to hold the manifold in place,. The turbocharger outlet is circular and oriented at a compound angle of about 60° to the horizontal plane of the intake port and about 25° to a vertical plane. The stock manifold is basically in the form of a rectangular tube with a 90° bend adjacent the engine air intake, joined to the turbocharger outlet through the 60°/25° compound curve. The 90° bend presents a challenge, particularly where (as in the case with the stock unit) the radius of the bottom (or inner) wall is considerably smaller than the radius of the top (or outer) wall at the bend.

Absent the constraints pointed out above, the velocity distribution through the bend could be considerably improved, resulting in a decreased impedance to air flow and pressure drop, by using the same radius for both the inner and outer walls and adding turning vanes in the bend. ("Heat Exchanger Design" by Arthur F. Frass, $2^{nd}$ Edition, published by John Wiley & Sons, Inc., 1989, pages 158-161).

The ATS manifold may provide an increased cross-sectional area for air flow and provides a somewhat larger inner radius at the 90° bend. However, to accomplish this, the manifold outlet opening (at the discharge end) is enlarged requiring that the proximal mounting screw extend from screw supporting seats, recessed into the upper side walls, along the side walls of the manifold. The resulting seat accommodating recesses, though smaller than the pinched-in-sides of the stock version, and the proximal mounting screws shafts extending inside the manifold still create a significant flow restriction resulting in less than optimum performance.

The Banks manifold eliminated the manifold pinched-in-side effect by forming apertured recessed seats for the heads of the proximal mounting screws on the top of the manifold with the shafts of the screws again extending through the interior of the manifold. The screw shafts as well as the inwardly protruding seats (to form a pleasing outside appearance) interrupt and impede the air flow resulting in less than optimum performance. Both the ATS and Banks manifolds are formed of cast aluminum.

Another aftermarket manifold marketed under the CFM+ logo is made of a plastic composite material with the claim that the composite has a smoother surface than cast aluminum and therefore produces less turbulence and a lower pressure drop. While the manufacturer claims that the CFM+ manifold provides a 44% increase in air flow over the stock unit and a 22% increase over the Bank's unit, it is not believed that the testing was measured using a predetermined pressure differential, e.g., 1.5" $H_2O$ across the manifold. Moreover, plastic (while perhaps providing less restriction to air flow) is a relative poor thermal conductor as compared to aluminum. Under many driving conditions the air exiting the turbocharger intercooler is hotter than the engine compartment air surrounding the air intake manifold. The superior thermal conductivity of aluminum (versus plastic) allows the manifold to function as a heat exchanger to remove some heat from and thereby cool the air entering the engine air intake.

In addition, the CFM+ proximal mounting screws are secured in seats located externally of the manifold which limits the maximum size of the manifold's outlet opening and the effective inner radius of the manifold at the 90° bend.

Also, there is a questions of strength of materials. Given the same wall thickness it is our opinion that aluminum is stronger than the CFM+ plastic composite.

There is a need for a more efficient air intake manifold for the referenced vehicle (and other vehicles exhibiting like characteristics) which not only provides an optimum air flow rate, but functions as a heat exchanger to provide some cooling effect for the air entering the engine air intake.

SUMMARY OF THE INVENTION

An aftermarket air flow coupler for connecting the outlet of a compressor, such as a turbocharger, to an internal combustion engine's air intake, in accordance with the present invention, is in the form of an elongated tubular manifold having a top, bottom and side walls. The manifold progresses from an upstream end defining a circular intake port, to a relatively short, generally straight proximal section, adapted to connect to the intake port to the turbocharger outlet, then to a sweeping compound curved central section, then to a section forming a generally 90° bend terminating in a generally rectangular discharge end defining a generally planar outlet port with a proximal side closest to the upstream end and a distal side remote from the upstream end. The manifold includes mounting screw receptacles forming apertured screw head retaining seats positioned along the proximal and distal sides of the outlet through which mounting screws may be inserted to secure the manifold to the engine's air intake. The seats positioned adjacent the proximal side are located in the interior of the manifold to optimize the size of the outlet port and provide an increased effective inner radius at the bend. Preferably the bottom wall, through the 90° bend, is in the form of an inclined plane further increasing the effective radius of the bottom wall through the bend. At least one, and preferably two, evenly spaced distal air flow turning vanes are positioned within the distal section with the vanes having a curvature comparable to the curvature of the distal section. The vanes promote uniform velocity distribution across the cross-section and downstream of the bend, thereby optimizing the flow rate.

Optionally a distal vane is positioned within the curvature of the distal section to promote uniform velocity distribution within that section. The curvature of the central section may extend upwardly along an axis x-c from the intake port along an angle of about 60° from a vertical plane intersecting the outlet port.

The improvement in air flow of the invention versus the stock unit was measured using a predetermined pressure differential, e.g., 1.5" $H_2O$ across the manifold with the result that the invention provides about a 30% improvement in air flow at that pressure differential which would represent a very useful operating power range for the engine. Specifically at this pressure differential the stock unit experienced an air flow of about 155 $ft^3$/min versus the manifold of the invention of about 206 $ft^3$/min. The increased air flow to the engine will result in improved engine performance and better fuel mileage under the same driving conditions.

The construction and operation of this invention may be best understood in reference to the following description of the preferred embodiment taken in conjunction with the appended drawings.

DESCRIPTION OF THE PREFERRED EMBODIMENT

Figure 3:
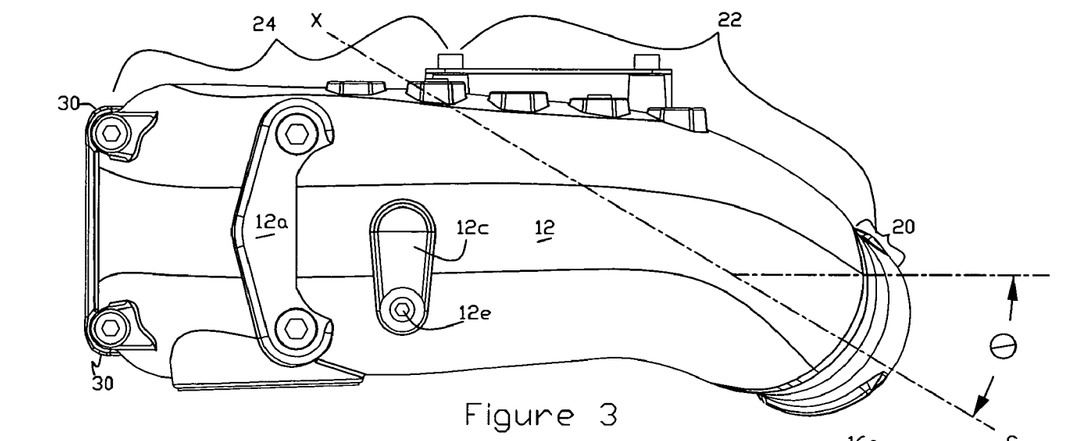
FIGS. 3 and 4 are top and bottom perspective views, respectively, of the manifold.
Figure 4:
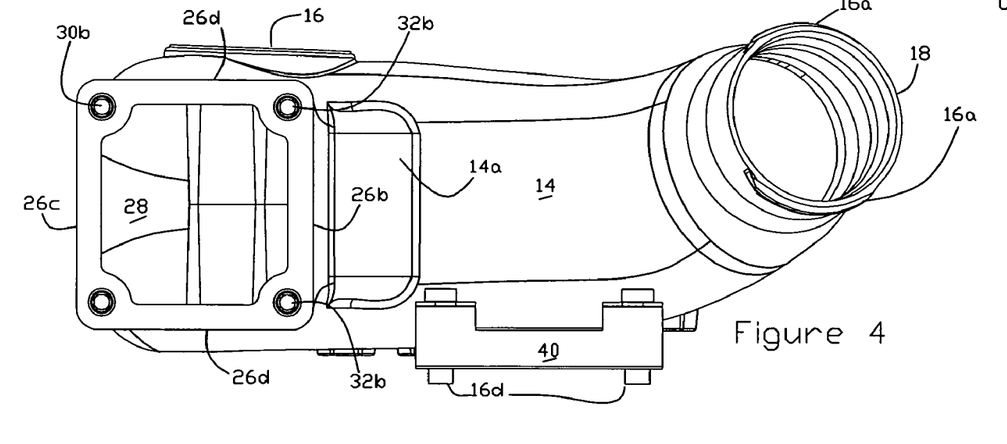

Referring now to FIGS. 1-7, a preferred embodiment of the intake manifold 10 is in the form of a cast aluminum elongated tubular member having a top (upper), bottom (lower), and side walls 12, 14, and 16, respectively, formed in three principal sections starting at the upstream end defining a circular intake port 18 adapted to be connected to the outlet of a tubrocharger intercooler (not shown) via a conventional hose and clamp (not shown). Outwardly projecting ribs 16a serve to maintain the hose and clamp in place on the manifold once installed. The upstream end progresses to a short, generally straight, proximal section 20 (e.g., about 1"-3" in length), thence to a sweeping curved central section 22 and finally to a more pronounced curved distal section 24 forming a 90° bend and terminating in a downstream end 26 surrounded by a peripheral rim 26a enclosing a generally rectangular outlet or discharge opening or port 28 (FIG. 4). By way of example only, the radius (r1) of the top wall through the bend is about 4-¼". See FIG. 2. The rim 26a includes a proximal side 26b, closest to the manifold upstream end, and an opposed distal side 26c, remote from the upstream end, with these sides joined together by longitudinal sides 26d. See FIG. 4. The lower surface 26e (FIG. 1) of the rim lies in a generally horizontal plane when the manifold is installed.

Center line c-c represents the curvature of the center of the several manifold sections with the axis x-c representing the orientation of the intake port (and outlet of the turbocharger) relative to the plane of the rim lower surface 26e. As is illustrated the axis x-c prescribes an angle Y of about 60° to the horizontal (FIG. 1) and an angle θ of about 25° with respect to a vertical plane (FIG. 3).

Two distal mounting screw receptacles 30 are integrally formed or cast on the exterior distal corners of the manifold defining planar screw head supporting seats 30a coaxially aligned with the vertical screw receiving bores 30b which extend through the rim 26a. See FIGS. 1 and 4.

Two proximal mounting screw receptacles 32 are integrally formed or cast on the interior proximal corners of the manifold defining planar screw head supporting seats 32a coaxially aligned with vertical screw receiving bores 32b and extending through the rim 26a. See FIG. 7.

Figure 5:
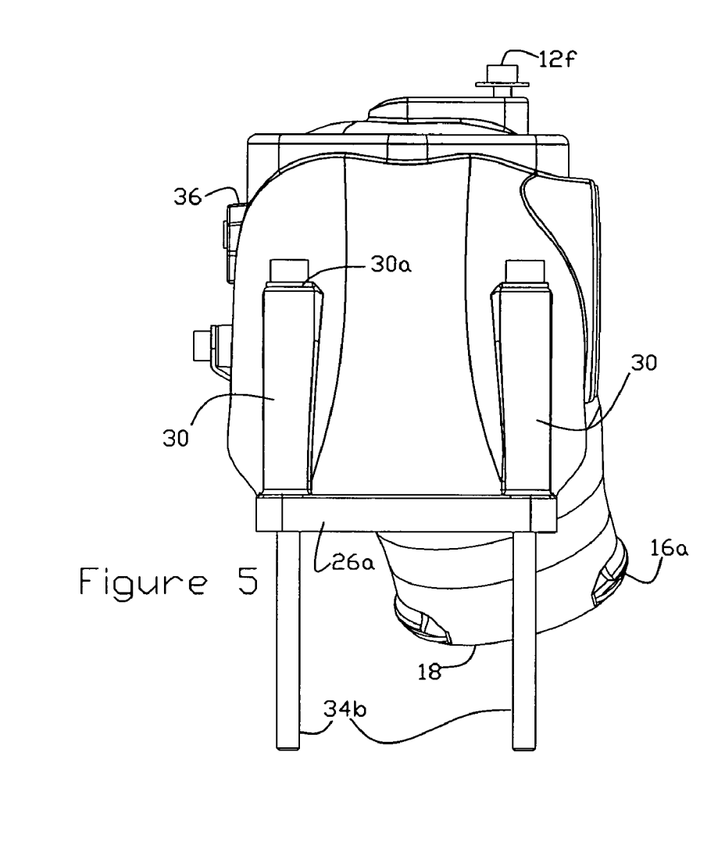
FIGS. 5 and 6 are distal and proximal perspective end views, respectively, of the manifold, also showing the mounting screws.
Figure 6:
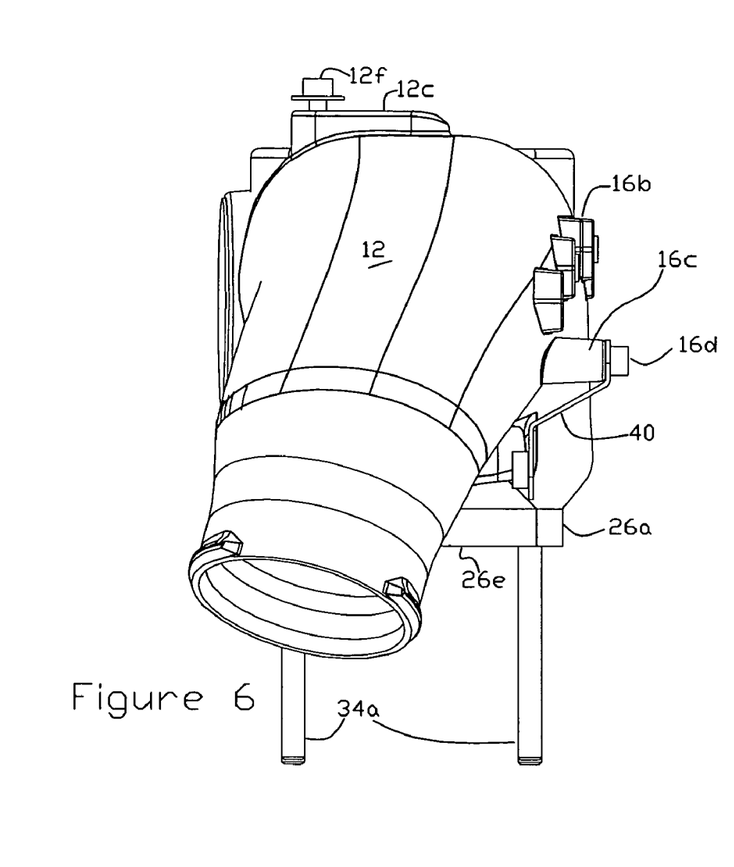

Proximal and distal mounting screws 34a and 34b, respectively, extend through the bores as shown in FIGS. 5 and 6. The proximal seats 32a are located on the inside proximal corners adjacent the terminal end of the 90° bend of the distal section of the manifold and extend at a height H2 above the lower rim surface 32a of between ¼" to 1-½ and preferably within the range of about ½" to 1¼" and most preferably about 1". See FIG. 9. Accordingly, the seats and the mounting screw heads positioned thereon provide a minimum obstruction to lower speed air flow along the inner radius of the bend.

Figure 7:
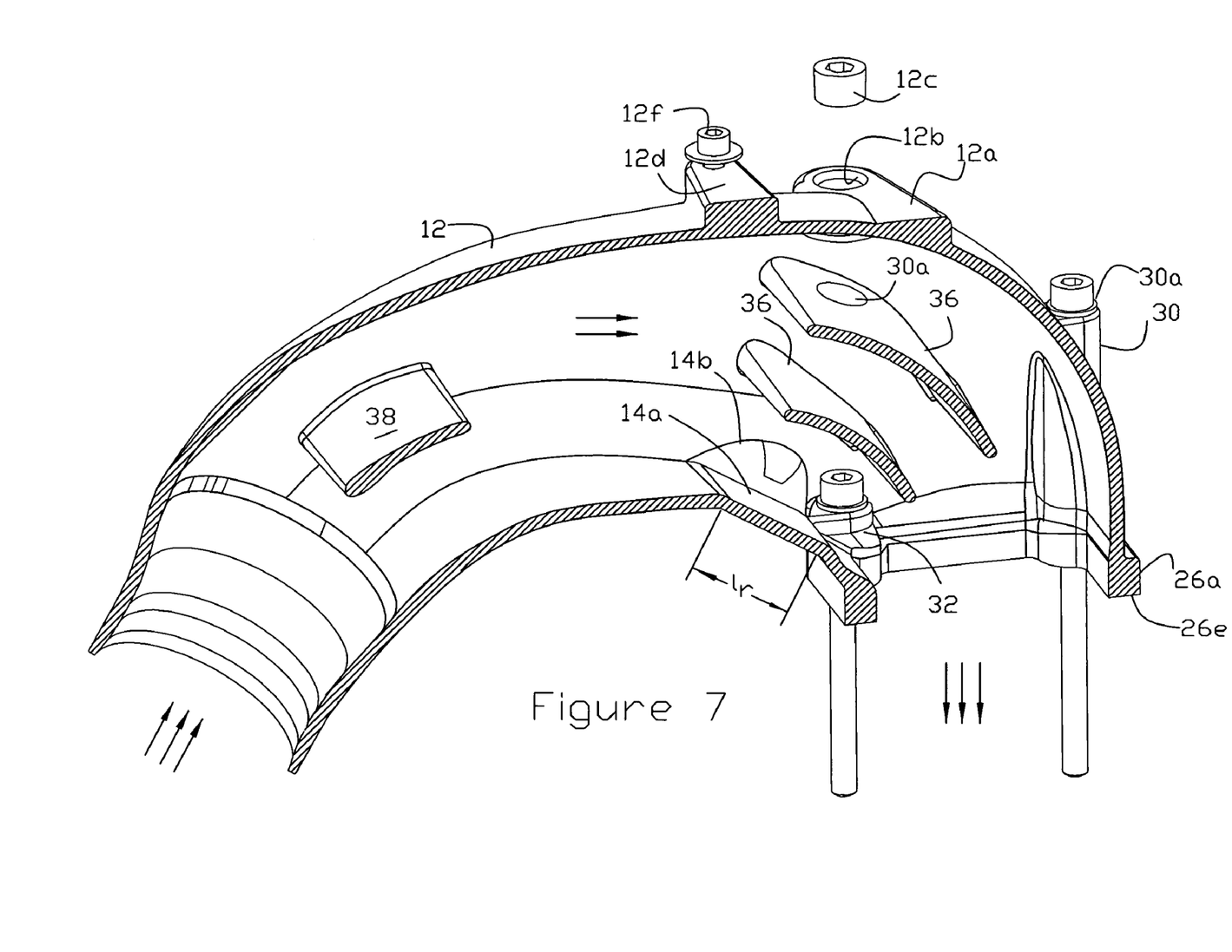
FIG. 7 is a cutaway view of the manifold of FIG. 2 showing the interior turning vanes and a centrally located ramp along the lower surface of the 90° bend.
Figure 8:
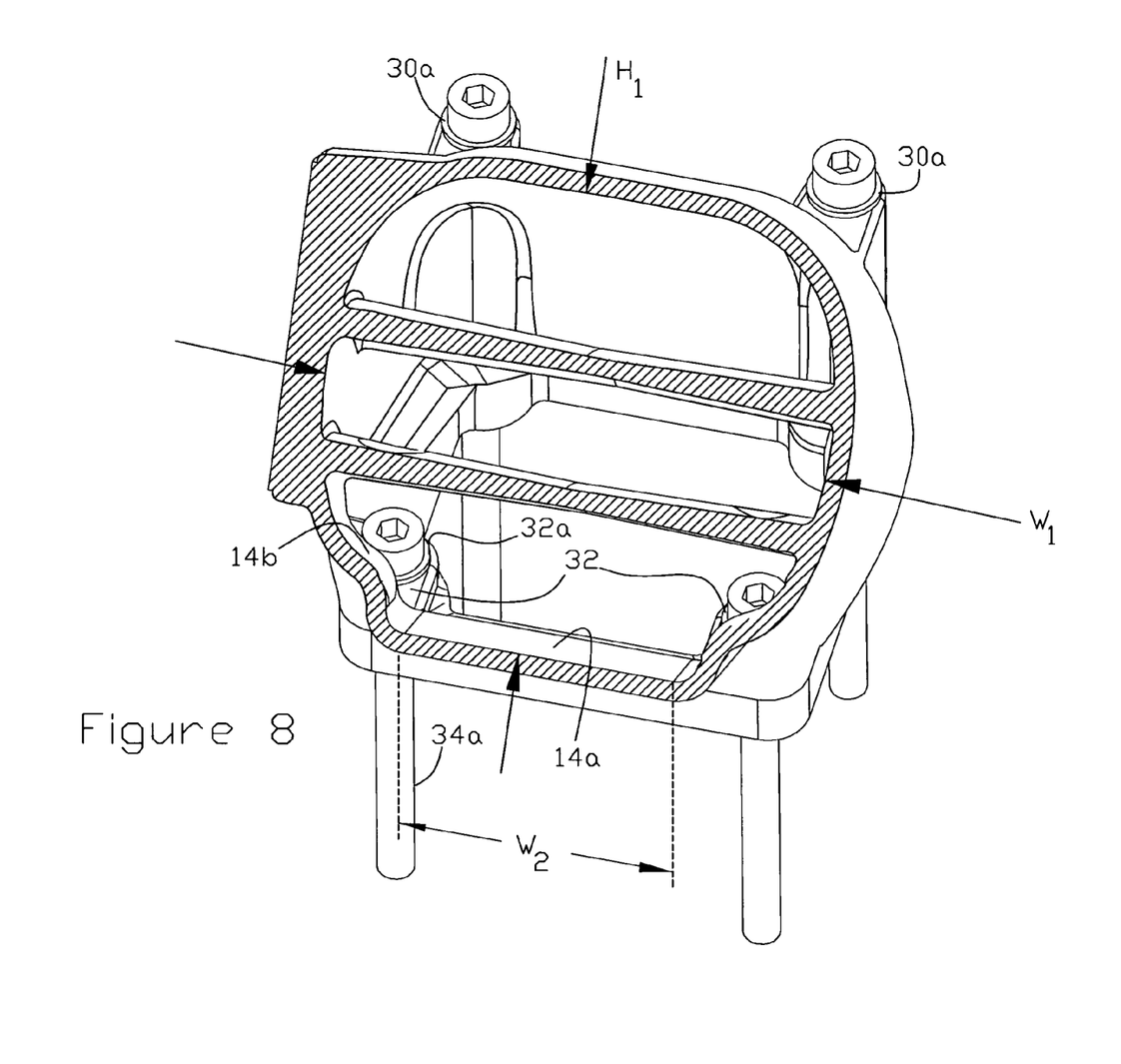
FIG. 8 is a cross-sectional view of the manifold taken along lines 8-8 of FIG. 1.
Figure 9:
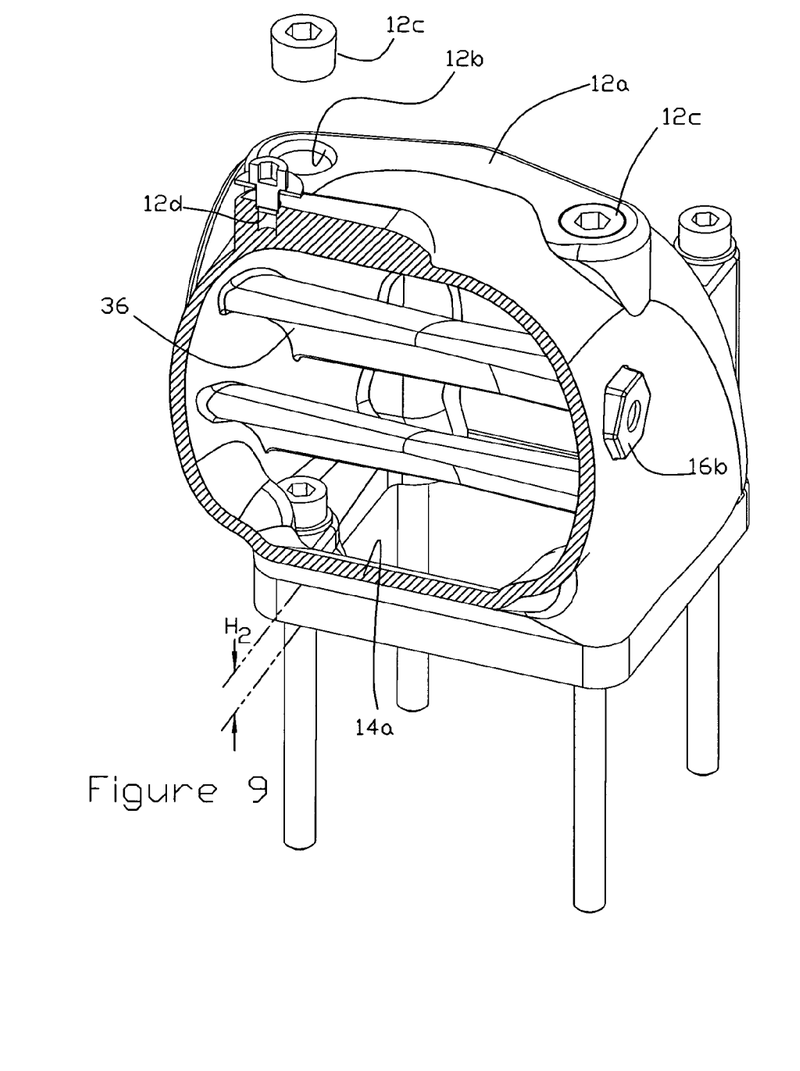
FIG. 9 is a cross-sectional view of the manifold taken along lines 9-9 of FIG. 1.

To optimize the size of the discharge opening and increase (along with the inset proximal screw seats 32a) the effective radius of the bottom wall 14 at the 90° bend the bottom wall is formed with a generally flat velocity-improving-distribution-segment or ramp 14a extending from a position adjacent the upper end 26f of the rim and between the proximal mounting screw receptacles to a position adjacent the upstream end of the 90° bend as is illustrated in FIG. 7. The ramp 14a is merged with the side walls 16 via corner portions 14b adjacent the proximal mounting screw receptacles 32b as shown in FIGS. 7-9. It is to be noted that instead of being flat this segment may be curved slightly with the goal in mind of providing an increased effective radius of curvature of the bottom wall versus simply continuing a normal 90° bend of the lower surface.

Referring now to FIG. 7 two distal internal turning vanes 36 are integrally formed or cast with the manifold to improve the velocity distribution and reduce pressure losses. The vanes are positioned within the 90° bend or distal section, substantially evenly spaced from each other and between the inner surfaces of the upper and lower walls as shown. The vanes extend between the inner surfaces of the side walls as shown. The vanes have a curvature generally following the curvature of the center line c-c as illustrated. The vanes as well as a lateral rib 12a, formed on the top wall, are provided with apertures 36a and 12b, respectively, to accommodate the insertion of the proximal mounting screws and a tool to insert and tighten the screws into the engine air intake plate. The apertures 12b are threaded to receive threaded set screws 12c allowing the apertures 12b to be closed after the proximal mounting screws are in place.

Figure 10:
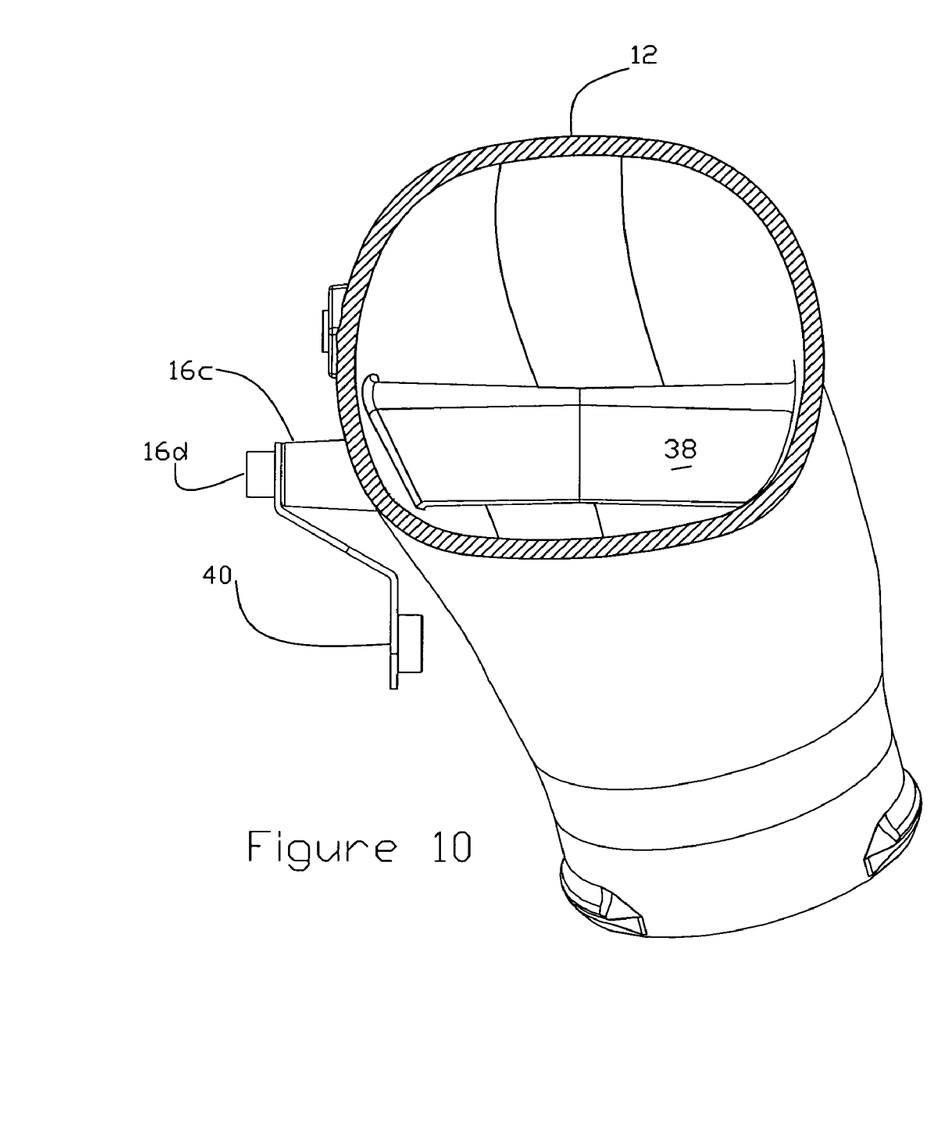
FIG. 10 is a cross-sectional view of the manifold taken along lines 10-10 of FIG. 1.

A proximal turning vane 38, formed, i.e., cast, integrally with the manifold, extends between the side walls in the distal section as is illustrated in FIGS. 7 and 10. The proximal vane has a radius of curvature approximating the curvature of centerline c-c and serves to promote uniform velocity of the air flowing into the distal section and reduce pressure losses.

A raised platform 12d is formed on the top wall, forward of the mounting screw aperture 12b, with a vertically oriented blind threaded bore 12e therein for receiving a screw 12f. The platform and screw 12f are arranged to accommodate an oil dipstick mounting tube present in the OEM manifold.

The right side wall of the manifold (when viewed from the perspective of FIG. 2) is formed with a plurality, i.e. 5, of six-sided protuberances 16b which can be drilled out to provide access to the air stream flowing to the engine air intake. For example, one of the drilled out bores may be connected to a pressure gage while others may be used to accommodate the introduction of fluids such as water or gas additives.

Two spaced generally cylindrical threaded posts 16c, positioned below the protuberances 16a, are arranged to support a bracket 40 via screws 16d. The bracket is arranged to support a wiring harness present in the OEM arrangement. See FIGS. 2 and 10.

By way of example the inside width W1 of the manifold at the cross-section of FIG. 8 is about 4-¼". The distance between the proximal screws 34a as determined by the OEM is 3-⅛" and the width W2 of the ramp 14a at this cross-section is about 2-⅝". Thus, the ratio of ramp width to the distance between the proximal mounting screw receptacles is about 0.84 and the length l of the ramp is about 1-½" inches. See FIG. 7. The inside height H1 of the manifold at cross-section 8 is about 4".

Figure 1:
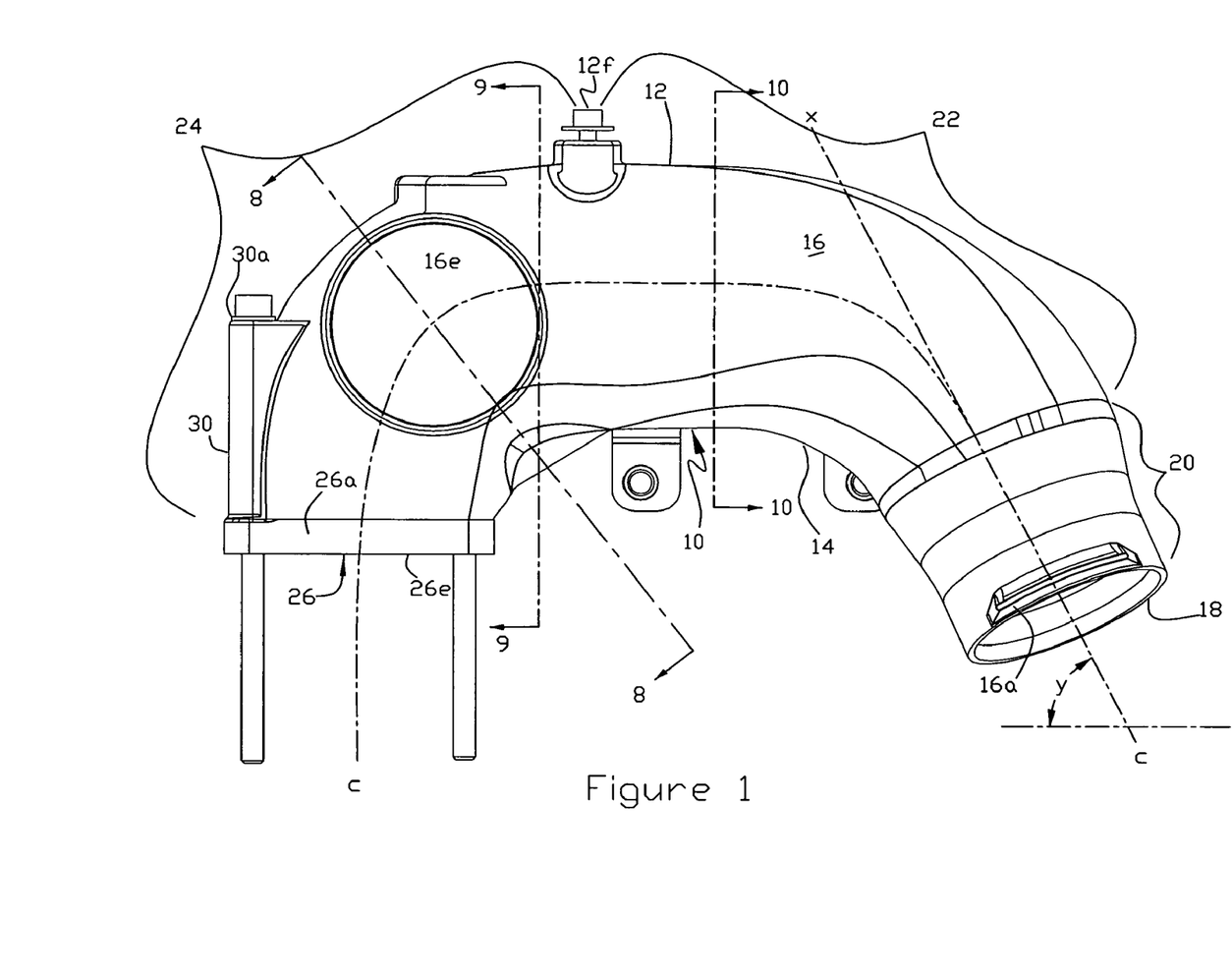
FIGS. 1 and 2 are right and left side perspective views of an intake manifold, in accordance with the present invention, showing the engine air intake mounting screws extending from the outlet port.
Figure 2:
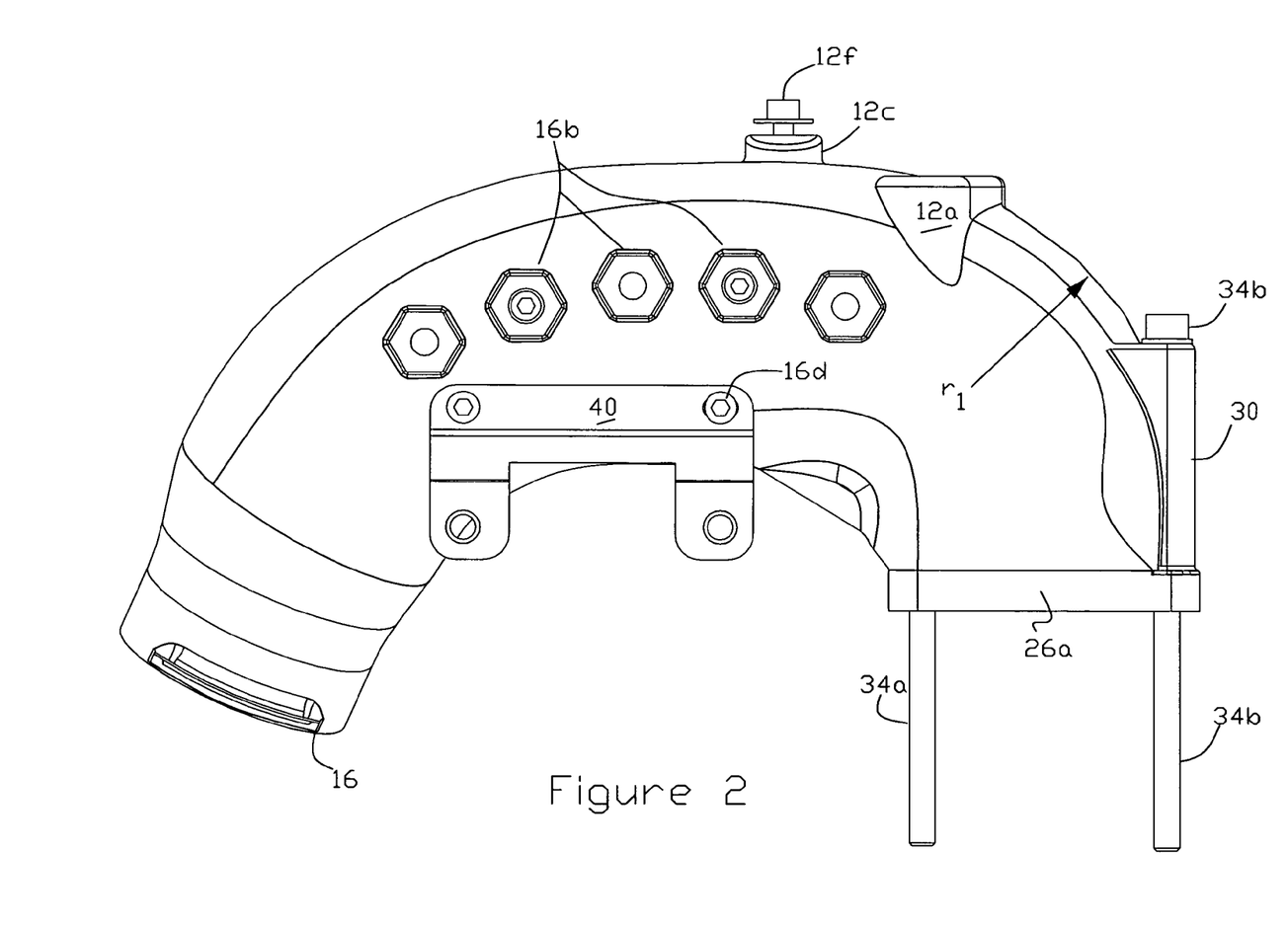

A digital photograph of our aftermarket intake manifold installed in the engine compartment of a Dodge truck, identified earlier, is attached to the IDS as item 6. As is illustrated in the photograph the commercial product includes decorative ribs on the side walls and the company's logo in the flat area 16d (FIG. 1).

There has thus been disclosed a performance enhancing intake manifold for coupling a compressor such as a turbocharger to the air intake of an internal combustion engine such as a diesel engine. Modifications and perhaps improvements thereof will occur to those skilled in this art without departing from the spirit and scope of our invention as defined in the appended claims.

What is claimed is:

1. An aftermarket air flow coupler for connecting the outlet of a compressor to an internal combustion engine's air intake opening comprising:
   an elongated manifold having a bottom, top and side walls and progressing from an upstream end, defining a generally circular intake port adapted to be connected to the compressor outlet, to a relatively short, generally straight, proximal section, then to a sweeping curved central section, then to a more steeply curved distal section forming substantially a 90° bend and terminating in a downstream end adapted to be connected to the engine air intake opening, the downstream end having a proximal side closest to the upstream end and an opposing distal side remote from the upstream end;
   the manifold including a plurality of mounting screw receptacles, two of the receptacles being disposed on the proximal side of the downstream end and within the interior of the manifold; and
   at least one distal vane positioned within the distal section having a curvature generally following generally the curvature of the distal section for inhibiting nonuniform velocity distribution of the air flowing through and downstream of the bend.

2. The invention of claim 1 wherein the bottom wall of the manifold at the 90° bend and between the proximal mounting screw receptacles forms a generally inclined plane extending from a position adjacent the downstream end substantially through the 90° bend for providing an increased internal cross-sectional area of the manifold through the bend and a reduced effective radius of curvature of the lower wall at the bend.

3. The invention of claim 1 wherein said at least one distal vane comprises at least two distal vanes having comparable curvatures.

4. The invention of claim 3 further including at least one proximal vane positioned within a portion of the central section, the proximal vane having a curvature generally following the curvature of said portion of the central section.

5. The invention of claim 1 further including two distal mounting screw receptacles disposed on the distal side and positioned on the exterior of the manifold.

6. The invention of claim 1 wherein the engine air intake is bracketed by four threaded bores for receiving screws to retain the distal end of the manifold and wherein the proximal and distal mounting screw receptacles are arranged to line up with the respective threaded bores.

7. The invention of claim 1 wherein the manifold downstream end terminates in a generally rectangular rim with a lower surface adapted to be positioned over the engine air intake opening and wherein the proximal mounting screw receptacles form seats for supporting the heads of mounting screws and with the seats being positioned at a height h2 above the lower surface of the rim within the range of ½" to 1-¼".

8. The invention of claim 1 wherein H2 is within the range of about ½" to 1-¼".

9. The invention of claim 8 wherein the manifold wall at the 90° bend between the proximal mounting screw receptacles forms a generally inclined plane extending from the rim substantially through the 90° bend for providing an increased cross-section area through the bend and reduced effective radius of curvature of the lower wall to the bend.

10. The invention of claim 9 further including a plurality of protuberances formed in a side wall, the protuberances being adapted to be drilled out to provide access to the air stream flowing to the engine air intake.

11. A coupler for connecting the outlet of a compressor to an internal combustion engine's air intake wherein the air intake defines two proximal threaded bores near the compressor and two opposed distal threaded bores remote from the compressor for receiving mounting screws to secure the coupler to the air intake, the coupler comprising:
   a tubular manifold having a top (12), bottom (14) and side walls (16) progressing from an upstream end (18), through a sweeping curved central section (22) to a steeply curved distal section (24) forming substantially a 90° bend and terminating in peripheral rim (26a) surrounding an air outlet port (26), the rim having opposed proximal (26b) and distal (26c) sides and a lower surface (26e) facing the engine air intake opening when installed; and
   the manifold including a pair of proximal (32) and distal (30) mounting screw receptacles located on the interior and exterior of the manifold, respectively, the receptacles being aligned with the respective air intake bores when the manifold is installed.

12. The invention of claim 11 wherein the mounting screw receptacles form seats (32a and 30a) for supporting the heads of mounting screws and wherein the seats formed by the proximal receptacles are positioned above the lower surface (26e) of the rim within the range of about ½" and 1-¼".

13. The invention of claim 12 wherein the bottom wall is formed with a ramp extending from a position adjacent the proximal side of the peripheral rim (26a), between the proximal mounting screw receptacles (32), and terminating at a position adjacent the proximal end of the bend.

14. The invention of claim 13 further including at least one distal turning vane (36) located within the 90° bend to promote uniform velocity flow through and downstream of the bend, the vane having a curvature generally following the curvature of the center line of the bend.

15. The invention of claim 14 wherein said at least one distal vane comprises two distal vanes (36) spaced about equal distances from each other and the top (12) and bottom (14) walls of the manifold in the bend area.

16. The invention of claim 15 further including a proximal turning vane located in the central section and having a curvature generally following the curvature of the manifold centerline in that section.

17. A coupler for connecting the outlet of a compressor to an internal engine's air intake comprising:
   a) a tubular manifold having a top (12), bottom (14), and opposed side walls (16) progressing from an upstream (18) end defining a generally circular intake port adapted to be connected to the outlet of the compressor, to a relatively short proximal section (20) then to a sweeping curved central section (22) and then to a distal section (24) forming substantially a 90° bend which terminates in a peripheral rim (26a) having a substantially flat surface (26e) arranged to be positioned over the engine air intake opening, the rim having a proximal (26b) and distal (26c) side;
   b) the manifold having two proximal and two distal mounting screw receptacles extending through the peripheral rim on the proximal and distal sides, respectively, the proximal mounting screw receptacles being positioned in the interior of the manifold and forming seats (32a) for retaining the heads of the associated mounting screws, the seats being located at a height H2 of between ½" to 1-½" above the surface (26e) of the rim (26a); and
   c) the manifold lower surface forming a substantially inclined plane (14a) extending from the rim substantially through the 90° bend to provide a reduced effective radius of the lower wall through the bend.

18. The invention of claim 17 further including at least one turning vane positioned within the distal section (36) of the manifold to improve the air flow velocity distribution within and downstream of the 90° bend.

19. The invention of claim 18 further including at least one turning vane (38) positioned within the proximal section of the manifold.

20. The invention of claim 19 wherein the proximal mounting screw seats (32a) are disposed above the bottom surface 26e of the rim 26a about ¾" to 1-¼".

* * * * *